(12) United States Patent
Chung et al.

(10) Patent No.: US 9,335,602 B2
(45) Date of Patent: May 10, 2016

(54) METHOD FOR CONTROL OF ELECTROCHROMIC DEVICE

(71) Applicant: TINTABLE SMART MATERIAL CO., LTD., Tainan (TW)

(72) Inventors: Yi-Wen Chung, Tainan (TW); Chien-He Lai, Tainan (TW)

(73) Assignee: Tintable Kibing Co., Ltd., Tainan (TW)

( * ) Notice: Subject to any disclaimer, the term of this patent is extended or adjusted under 35 U.S.C. 154(b) by 0 days.

(21) Appl. No.: 14/340,672

(22) Filed: Jul. 25, 2014

(65) Prior Publication Data

US 2016/0026059 A1 Jan. 28, 2016

(51) Int. Cl.
| | |
|---|---|
| *G02F 1/153* | (2006.01) |
| *G02F 1/15* | (2006.01) |
| *G02F 1/163* | (2006.01) |
| *G02F 1/155* | (2006.01) |
| *C09K 9/00* | (2006.01) |
| *B60R 1/08* | (2006.01) |

(52) U.S. Cl.
CPC ............... *G02F 1/163* (2013.01); *B60R 1/088* (2013.01); *C09K 9/00* (2013.01); *G02F 1/15* (2013.01); *G02F 1/155* (2013.01)

(58) Field of Classification Search
CPC .......... G02F 1/15; G02F 1/155; G02F 1/163; C09K 9/00; B60R 1/088
USPC .................. 359/265–275, 603, 604
See application file for complete search history.

(56) References Cited

U.S. PATENT DOCUMENTS 6,595,649 B2 * 7/2003 Hoekstra ................ B60R 1/088
359/267

* cited by examiner

*Primary Examiner* — William Choi
(74) *Attorney, Agent, or Firm* — Rosenberg, Klein & Lee

(57) ABSTRACT

A method for control of electrochromic devices is revealed. First a duty cycle of PWM is changed to a preset Q value according to a signal detected by a detector while the electrochromic device is switched to the colored state. The Q value represents electric charge that corresponds to colored-state transmittance. Then turn off the PWM. Thus the response time for coloration and the transmittance of the electrochromic device are maintained within a preset range, without being affected by ambient temperature, setting time and aging of the materials used. Thus the electrochromic device is more convenient to use and having more practical value.

2 Claims, 2 Drawing Sheets

METHOD FOR CONTROL OF ELECTROCHROMIC DEVICE

BACKGROUND OF THE INVENTION

1. Fields of the Invention

The present invention relates to a method for control of electrochromic devices, especially to a method for control of electrochromic devices by which the response time for coloration and the transmittance of the electrochromic devices are maintained within a preset range without being affected by ambient temperature, setting time and aging of the materials used. Thus the electrochromic device is more convenient to use and having more practical value.

2. Descriptions of Related Art

Along with fast development of technology, various kinds of special materials have been invented. Electrochromic devices are devices that have the possibility to change their color reversibly by applying an external voltage. The coloration and bleaching of the electrochromic device are initiated by a drive voltage. After being driven by the voltage, the electrochromic device is changed from transparent state to colored state. The electrochromic device is a multi-layer electrochemical appliance that has the property of color changing due to electrochemical redox reactions after being applied with a voltage. Thus the electrochromic devices can be applied to change optical transmittance of the glass for blocking intense sunlight or for providing privacy.

While in use, the transmittance is reduced, the absorbance is increased and the color is getting deeper when a positive voltage is applied to the electrochromic device. Once a negative voltage is applied to the electrochromic device, the transmittance is increased, the absorbance is decreased and the color is getting lighter. By applying positive and negative voltage alternately, the electrochromic device carries out oxidation or reduction reaction for adjustment of transmittance.

However, although the transmittance of the electrochromic device can be adjusted to a desired value by switching between the positive and negative voltages applied, the response time for coloration and the transmittance are still affected by other factors including ambient temperature, setting time and aging of the material used. These all cause inconvenience in operation of the electrochromic device and there is room for improvement.

Thus there is a need to provide a method for control of electrochromic devices having more practical value.

SUMMARY OF THE INVENTION

Therefore it is a primary object of the present invention to provide a method for control of electrochromic devices by which the response time for coloration and the transmittance of the electrochromic devices can be maintained within a preset range no matter the ambient temperature is high or low, the setting time is long or short, the materials for the electrochromic device have aged or not. Thus the electrochromic device is convenient to use and is more practical while in use.

In order to achieve the above object, a duty cycle of PWM is adjusted to a preset Q value according to a signal detected by a detector. The Q value represents electric charge corresponding to colored-state transmittance. Then the PWM is turned off. Thus the response time for coloration and the transmittance of the electrochromic devices are maintained within a preset range.

The Q value is calculated according to the following equation:

$$Q = \sum_{t=t0}^{t1}(I_t \times Duty1) + \sum_{t=t1}^{t2}(I_t \times Duty2) + \ldots + \sum_{t=t(n-1)}^{tn}(I_t \times Dutyn)$$

wherein Q represents electric charge corresponding to colored-state transmittance (mA*Sec), I is current (mA), t is time (Sec), and Duty represents Duty cycle of PWM.

The signal detected by the detector includes system temperature, current magnitude, and terminal voltage.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
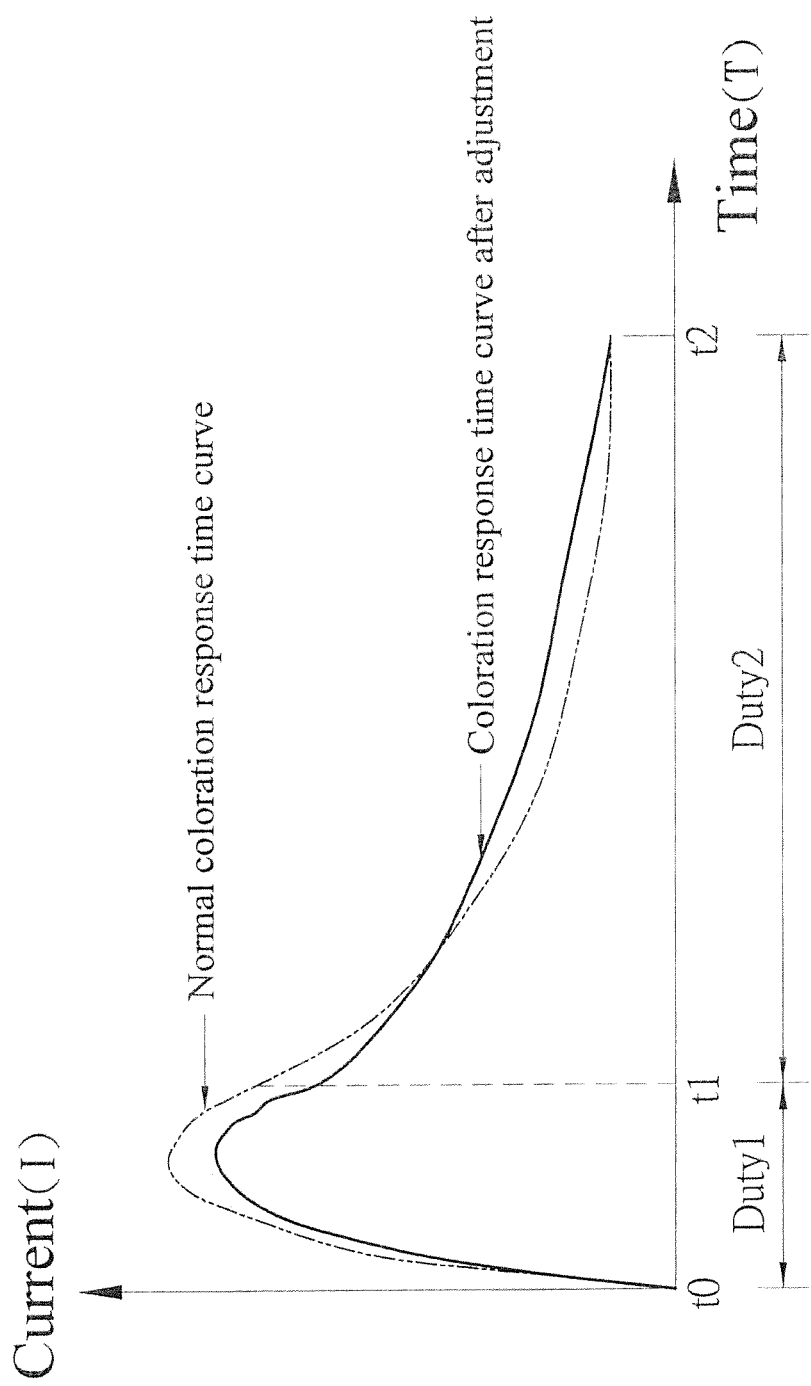
FIG. 1 is a schematic drawing showing a current-time curve of an embodiment according to the present invention.
Figure 2:
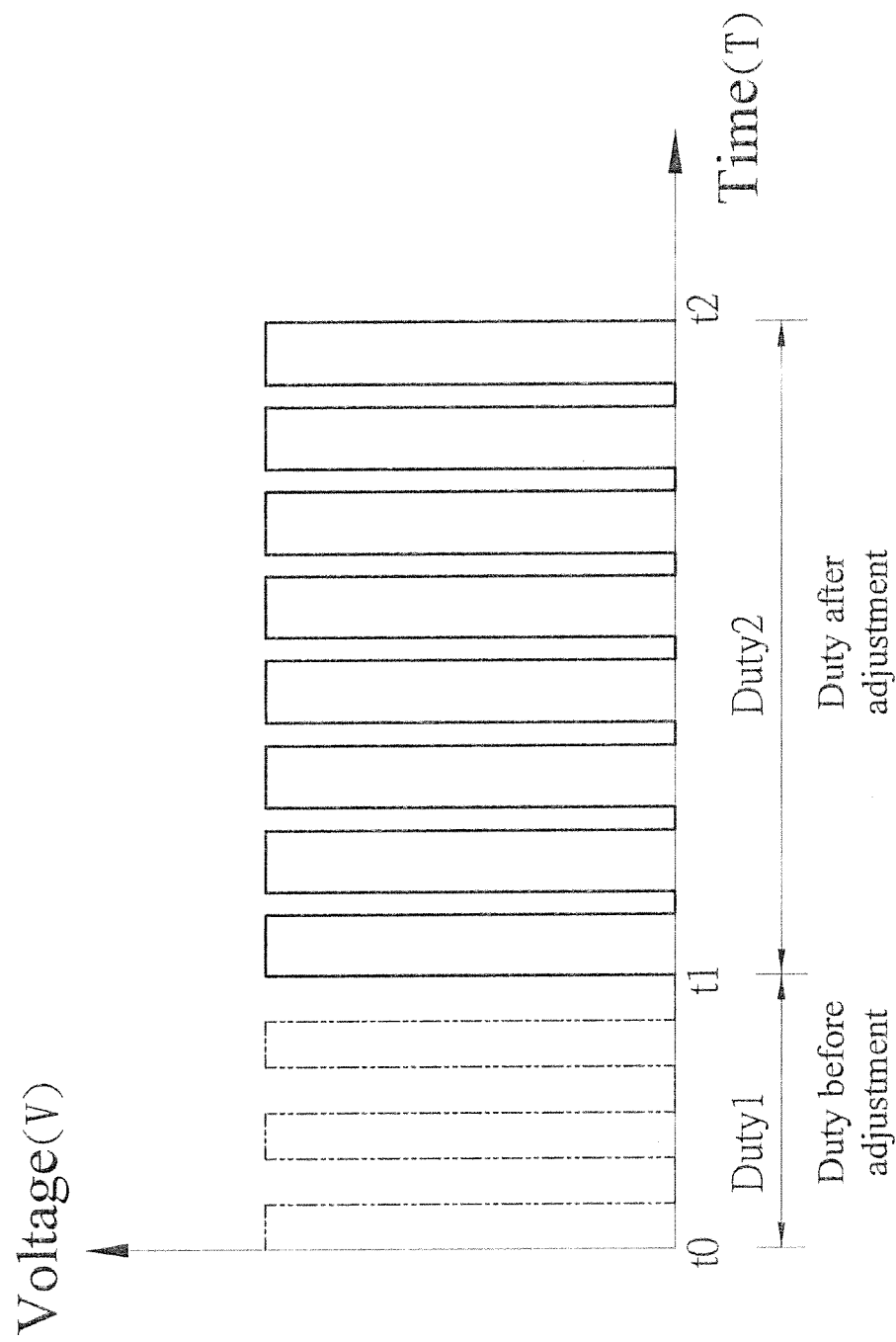
FIG. 2 is a curve showing the relation between pulse width and time of an embodiment according to the present invention.

Refer to FIG. 1 and FIG. 2, a detector is used to detect system temperature, current magnitude, or terminal voltage while an electrochromic device is changing to the colored state. Thus a duty cycle of PWM is changed to a preset Q value, electric charge corresponding to colored-state transmittance, according to detection results of the detector. Then turn off the PWM. Thus the response time for coloration and the transmittance of the electrochromic devices are maintained within a preset range.

The Q value is calculated by the following equation:

$$Q = \sum_{t=t0}^{t1}(I_t \times Duty1) + \sum_{t=t1}^{t2}(I_t \times Duty2) + \ldots + \sum_{t=t(n-1)}^{tn}(I_t \times Dutyn)$$

wherein Q: electric charge corresponding to colored-state transmittance (mA*Sec)
I: current (mA)
t: time (Sec)
Duty: Duty cycle of PWM Take the effect of ambient temperature on the electrochromic device as an example. Generally, coloration of the electrochromic device is slowed down in a low temperature environment and the electrochromic device is unable to operate properly. The coloration is speeded up in a high temperature environment. This accelerates the deterioration of the electrochromic device. In order to make the electrochromic device provide preset functions normally, the Duty (duty cycle of PWM) is controlled. The test data of the electrochromic device with PWM Duty of 50.0%, 58.6%, and 99.1% and at 60° C., 25° C. and −10° C. is as follows.

| Duty | 50.0% | 58.6% | 99.1% |
| --- | --- | --- | --- |
| 1 * t | 528000 (five hundred twenty eight thousand) | 450000 (four hundred fifty thousand) | 266000 (two hundred sixty six thousand) |

-continued

| Duty | 50.0% | 58.6% | 99.1% |
|---|---|---|---|
| 60° C. colored | 26.0 sec | 23.0 sec | |
| 25° C. colored | 28.3 sec | 25.0 sec | 15.0 sec |
| −10° C. colored | | 39.0 sec | 25.7 sec |

In summary, compared with control methods available now, the response time for coloration and transmittance of the electrochromic device are maintained within a preset range by the method of the present invention without being affected by ambient temperature, setting time and aging of the materials used. Thus the electrochromic device is more convenient and practical in use.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A method for control of electrochromic devices comprising the steps of:

changing a duty cycle of PWM to a preset Q value according to a signal detected by a detector while the electrochromic device is switched to colored state and the Q value represents electric charge corresponding to colored-state transmittance; and turning off the PWM;

thereby response time for coloration and transmittance of the electrochromic device are maintained within a preset range;

wherein the Q value is calculated according to the following equation:

$$Q = \sum_{t=t0}^{t1}(I_t \times Duty1) + \sum_{t=t1}^{t2}(I_t \times Duty2) + \ldots + \sum_{t=t(n-1)}^{tn}(I_t \times Dutyn)$$

wherein Q represents electric charge corresponding to colored-state transmittance (mA*Sec), I is current (mA), t is time (Sec), and Duty represents Duty cycle of the PWM.

2. The method as claimed in claim 1, wherein the signal detected by the detector is selected from the group consisting of system temperature, current magnitude, and terminal voltage.

* * * * *